(12) United States Patent
Ho

(10) Patent No.: US 9,812,999 B2
(45) Date of Patent: Nov. 7, 2017

(54) AC AND DC BRUSHLESS MOTOR FOR FAN

(71) Applicant: Tsung-Te Ho, Chiayi County (TW)

(72) Inventor: Tsung-Te Ho, Chiayi County (TW)

( * ) Notice: Subject to any disclaimer, the term of this patent is extended or adjusted under 35 U.S.C. 154(b) by 0 days.

(21) Appl. No.: 14/749,805

(22) Filed: Jun. 25, 2015

(65) Prior Publication Data

US 2016/0380561 A1  Dec. 29, 2016

(51) Int. Cl.
| | |
|---|---|
| *H02P 6/00* | (2016.01) |
| *H02K 5/16* | (2006.01) |
| *H02K 7/08* | (2006.01) |
| *H02K 11/02* | (2016.01) |
| *H02K 11/20* | (2016.01) |
| *H02K 11/33* | (2016.01) |

(52) U.S. Cl.
CPC .............. *H02P 6/002* (2013.01); *H02K 5/16* (2013.01); *H02K 7/08* (2013.01); *H02K 11/02* (2013.01); *H02K 11/20* (2016.01); *H02K 11/33* (2016.01)

(58) Field of Classification Search
CPC .. H02P 23/26; H02P 2201/15; H02P 2201/13; H02M 1/42
USPC .................................................... 318/400.24
See application file for complete search history.

(56) References Cited

U.S. PATENT DOCUMENTS

| | | | | |
|---|---|---|---|---|
| 9,331,566 | B1 * | 5/2016 | Banayan | H02M 5/4585 |
| 2003/0175124 | A1 * | 9/2003 | Hahn | H02P 6/28 |
| | | | | 417/44.1 |
| 2008/0115512 | A1 * | 5/2008 | Rizzo | B60H 1/00428 |
| | | | | 62/134 |
| 2010/0231147 | A1 * | 9/2010 | Milesi | H02P 6/24 |
| | | | | 318/375 |
| 2011/0031911 | A1 * | 2/2011 | Marcinkiewicz | H02M 1/4225 |
| | | | | 318/400.3 |
| 2011/0291500 | A1 * | 12/2011 | Tang | H02K 11/33 |
| | | | | 310/64 |
| 2013/0170951 | A1 * | 7/2013 | Sato | H02P 6/06 |
| | | | | 415/1 |

\* cited by examiner

*Primary Examiner* — Bickey Dhakal
(74) *Attorney, Agent, or Firm* — Jackson IPG PLLC; Demian K. Jackson

(57) ABSTRACT

AC and DC brushless motor for the fan, comprising a brushless motor; and an active power adjustment mechanism, disposed within the brushless motor and comprising an EMI filtering and rectifying unit, a prior driving unit connected to the EMI filtering and rectifying unit, a motor driving unit connected to the brushless motor, a constant current unit connected to the EMI filtering and rectifying unit and the prior driving unit, a protective compensation unit connected to the prior driving unit and the constant current unit, a motor controlling unit connected to the motor driving unit, and a sensing unit connected to the motor controlling unit.

6 Claims, 5 Drawing Sheets

AC AND DC BRUSHLESS MOTOR FOR FAN

FIELD OF THE INVENTION

The present invention relates to an alternating current (AC) and direct current (DC) brushless motor for a fan, and particularly to such brushless motor for the fan, where an active power adjustment mechanism is used together to enable a low voltage DC brushless motor for the fan to be driven by directly using an AC power or a DC power to improve a power consumption of a conventional AC motor for the fan or achieve the efficacy of energy saving.

DESCRIPTION OF THE RELATED ART

Typically, an AC fan motor is inputted with a power of 50/60 Hz, which involves a poor efficiency, a large energy loss, and a power factor of approximately 0.4 to 0.6. If it is desired to increase or decrease a rotational speed of the motor, an alternating frequency has to be provided.

The currently available DC brushless fan motor is mostly connected to an external AC/DC power. If an AC power is directly used to drive the fan motor, the motor will become to have a lower efficiency due to that no power factor may be modulated so that the coil of the motor presents an inductance. On the other hand, the typical DC brushless fan motor uses a constant frequency PWM, where the power is turned on or off periodically to determine the rotational speed of the motor. When being driven by this policy, the efficiency of the motor will become poorer. Under the same power output's condition, 100% of PWM may correspond to a more saved energy compared with 50% of PWM, and which is the same to the case of 50% and 20% of PWM. Generally, such fan motor operates mostly in a middle to low rotational speed, and seldom in a full speed. Hence, the policy of periodically turning on or off by using the PWM to drive the motor may have a very poor efficiency. However, the present invention adopts a constant power full-periodic output on its power modulation controlling unit, modulation constant-current unit and prior driving unit may have a higher efficiency as compared to the case where the PWM is used to drive the DC brushless motor under a speed other than the full speed. Therefore, the above issue may be effectively solved, and an active power adjustment mechanism may be inputted with a wide voltage DC power.

Therefore, the inventor of the present invention sets forth an AC and DC brushless motor for the fan after research with efforts, to effectively improve the shortcomings of the large power loss and the lower efficiency encountered in the prior art.

SUMMARY OF THE INVENTION

It is, therefore, an object of the present invention to provide an AC and DC brushless motor for a fan, so that an active power adjustment mechanism may be used together to enable a low voltage DC brushless motor for the fan to be driven by directly using an AC power or a DC power to improve a power consumption of a conventional AC motor for the fan or achieve to the efficacy of energy saving.

According to the present invention, the AC and DC brushless motor for the fan, comprising a brushless motor; and an active power adjustment mechanism, disposed within the brushless motor and comprising an EMI filtering and rectifying unit, a prior driving unit connected to the EMI filtering and rectifying unit, a motor driving unit connected to the brushless motor, a constant current unit connected to the EMI filtering and rectifying unit and the prior driving unit, a protective compensation unit connected to the prior driving unit and the constant current unit, a motor controlling unit connected to the motor driving unit, and a sensing unit connected to the motor controlling unit.

In an embodiment, the brushless fan motor comprises a first case having the active power adjustment mechanism disposed therewithin, a first rotor combined within an inner rim of the first case, a first stator disposed within and corresponding to the first rotor and being connected to the motor driving unit, a first bearing disposed within the stator, and a first shaft penetrating through the first bearing.

In an embodiment, the brushless motor comprises a second case having the active power adjustment mechanism disposed within the case, a second stator combined within an inner rim of the second case and being connected to the motor driving unit, a second rotor disposed within and corresponding to the second stator, a second set of bearings disposed at a first end and a second end of the second case, and a second shaft penetrating through the second rotor and the second bearings.

In an embodiment, the EMI filtering and rectifying unit is connected to a lead wire.

In an embodiment, the motor controlling unit is further connected to a frequency generation (FG) signal or a rotational detection (RD) alarm signal.

In an embodiment, the active power adjustment mechanism further comprises a constant current connecting unit or the power modulation controlling unit connected to the motor controlling unit.

In an embodiment, the modulation current controlling unit generates an input signal by a pulse width modulation (PWM) controlling signal, a switch, a wireless communications controller, a digital/analog signal controller, a photosensitive element, or a thermistor.

BRIEF DESCRIPTIONS OF THE DRAWINGS

The present invention will be better understood from the following detailed descriptions of the preferred embodiments according to the present invention, taken in conjunction with the accompanying drawings, in which.

DESCRIPTION OF THE PREFERRED EMBODIMENTS

Figure 1:
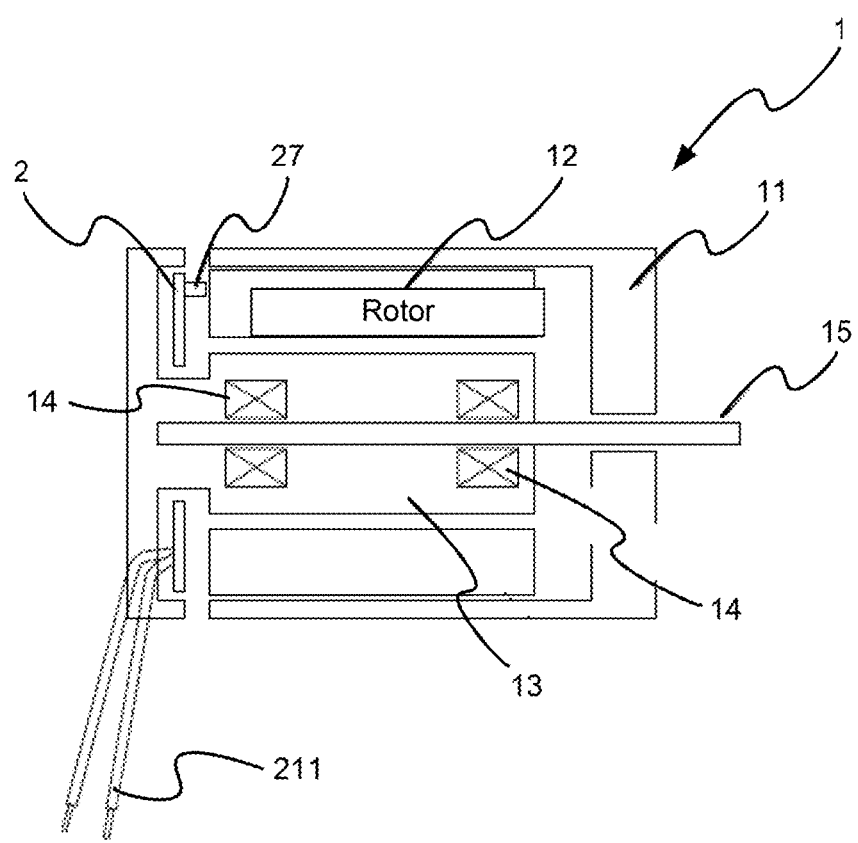
FIG. 1 is a schematic diagram of a basic architecture according to a first embodiment of the present invention.
Figure 2:
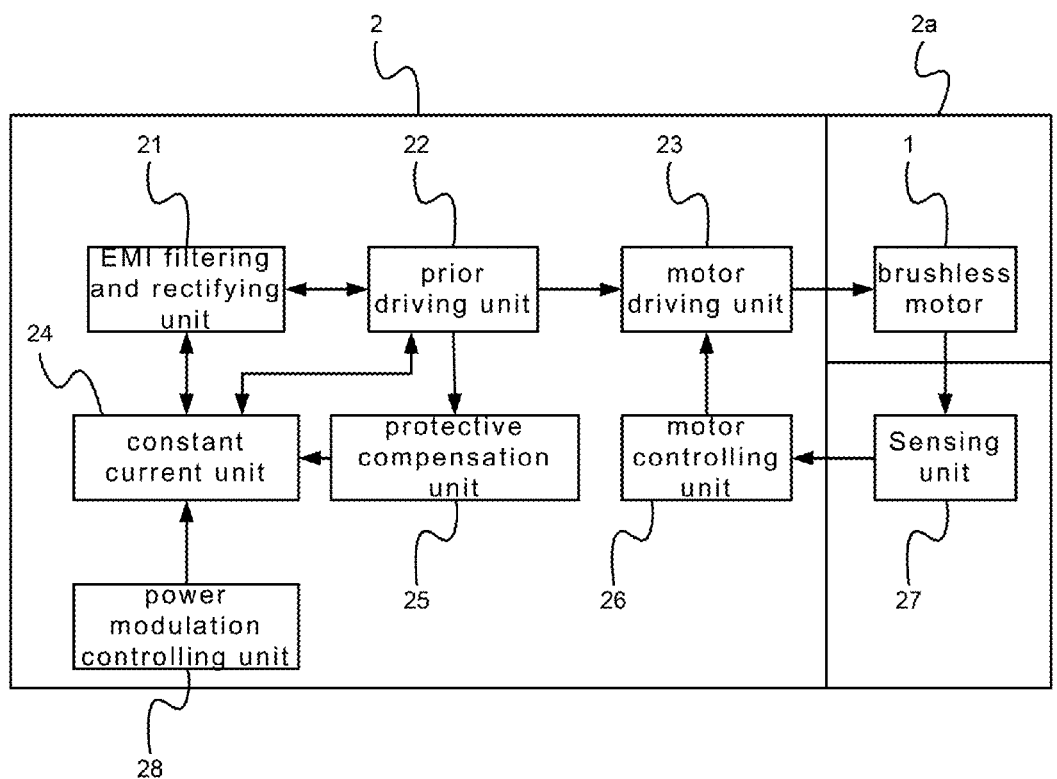
FIG. 2 is a schematic block diagram according to the present invention.
Figure 3:
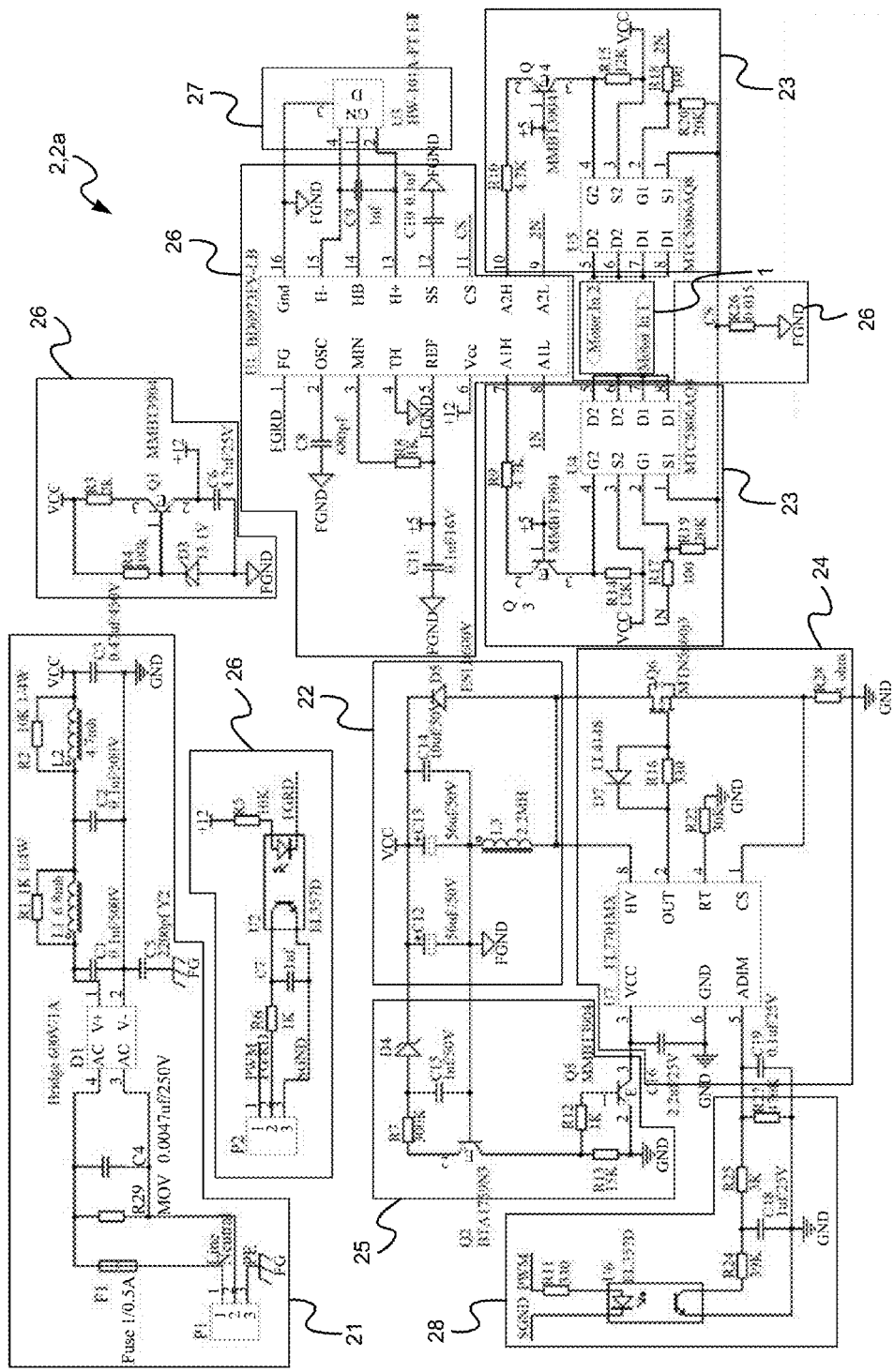
FIG. 3 is a schematic diagram of a circuit according to the present invention.
Figure 4:
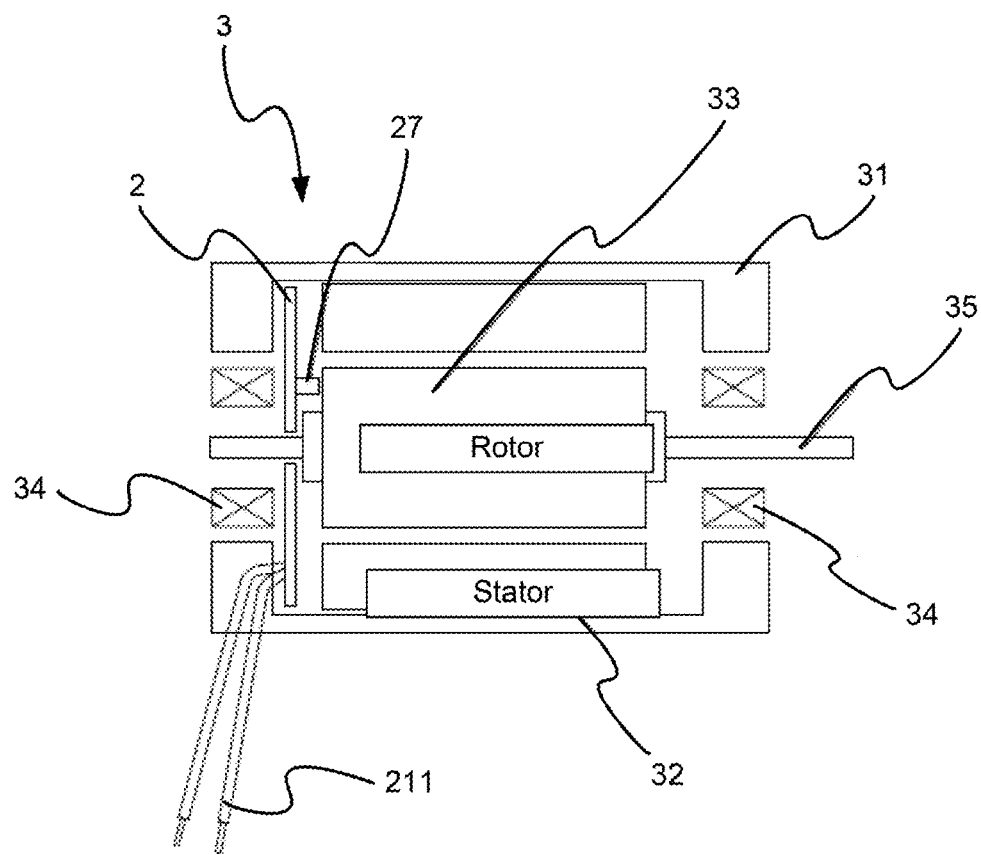
FIG. 4 is a schematic diagram of the basic architecture according to a second embodiment of the present invention.
Figure 5:
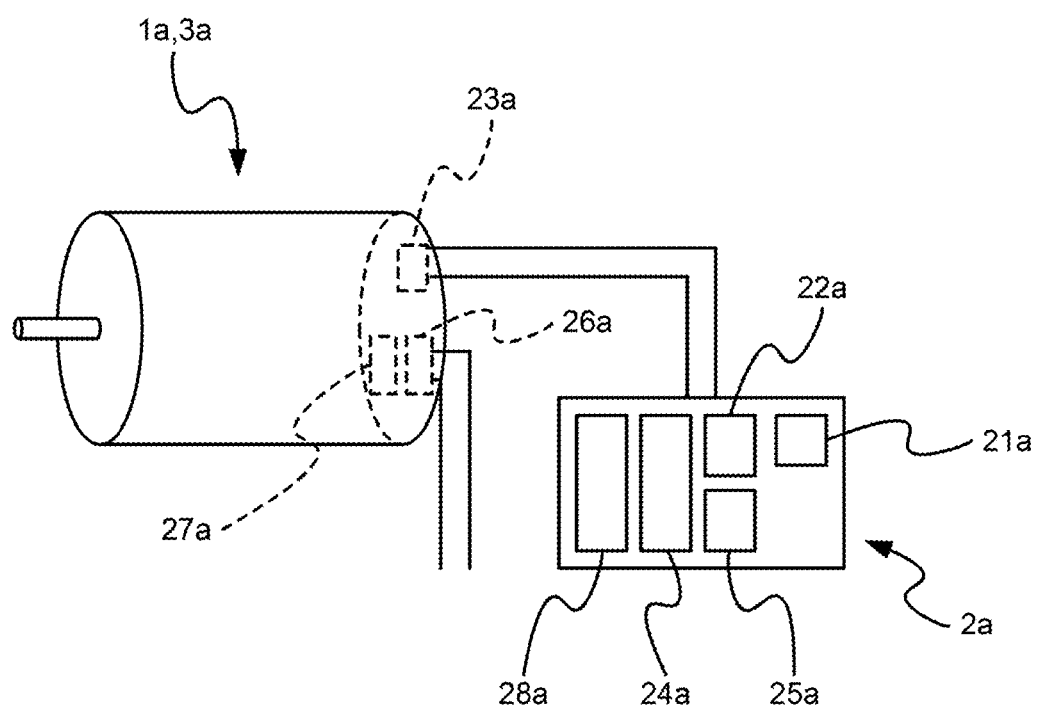
FIG. 5 is a schematic diagram of the basic architecture according to a third embodiment of the present invention.

Referring to FIG. 1, FIG. 2, and FIG. 3, FIG. 1 is a schematic diagram of a basic architecture according to a first embodiment of the present invention, FIG. 2 is a schematic block diagram according to the present invention, FIG. 3 is a schematic diagram of a circuit according to the present invention, FIG. 4 is a schematic diagram of the basic architecture according to a second embodiment of the present invention, and FIG. 5 is a schematic diagram of the basic architecture according to a third embodiment of the present invention.

The brushless fan motor 1 may be an outer-rotor motor and comprises a case 11, a rotor 12, a stator 13, a bearing 14, and a shaft 15. The rotor 12 is combined within an inner rim of the case 11. The rotor 12 is combined within an inner rim of the case 11. The stator 13 is disposed within and corresponding to the rotor 12. The bearing 14 is disposed within the stator 13. The shaft 15 penetrates through the bearing 14.

The active power adjustment mechanism 2 is disposed within the case 11 of the brushless fan motor 1, and comprises an EMI filtering and rectifying unit 21, a prior driving unit 22, a motor driving unit 23, a constant current unit 24, a constant current unit 24, a protective compensation unit 25, a motor controlling unit 26, and a sensing unit 27. The prior driving unit 22 is connected to the EMI filtering and rectifying unit 21. The constant current unit 24 is connected to the EMI filtering and rectifying unit 21 and the prior driving unit 22. The protective compensation unit 25 is connected to the prior driving unit 22 and the constant current unit 24. The motor controlling unit 26 is connected to the prior driving unit 22. The sensing unit 27 is connected to the motor controlling unit 26.

The EMI filtering and rectifying unit 21 is connected to a lead wire 211. The active power modulation mechanism 2 further has a power modulation controlling unit 28 connected to the constant current unit 24, or a power modulation controlling unit 28 connected to the motor controlling unit 26. Furthermore, the motor controlling unit 26 is also connected to a frequency generation (FG) or a rotational detection alarm (RD) output signal.

The modulation current controlling unit 28 has an input signal, which is a pulse width modulation (PWM) controlling signal, a switch, a wireless communications controller, a digital/analog signal controller, a photosensitive element, or a thermistor. As such, the above structure constitutes a novel AC and DC brushless fan motor.

When the present invention is operated, it may be inputted with an AC power or a DC power through the lead wire 211. After the EMI filtering and rectifying unit 21 performs a rectifying and EMI filtering task, the constant current unit 24 and the prior driving unit 22 operate in coordination with a semiconductor switch element, a current limitation resistor and an inductive element according to a frequency and a setup peak current to acquire a required power from the AC (a DC mode constant current in the case of the DC power).

If the AC power has the waveform of 50/60 Hz, the constant current unit 24 is further equipped with a power factor correction (PFC) function, and a resistive load is presented. Then, the prior driving unit 22, the motor driving unit 23, the motor controlling unit 26 and the stator 13 work together to enable the rotor 12 of the brushless motor 1 to rotate due to a generated magnetic field. Further, the protective compensation unit 25 conducts an over-voltage protection or a feedback compensation. Simultaneously, the sensing unit 27 is used to detect a phase and polarity of the motor. Then, the motor controlling unit 26, the motor driving unit 23, and the stator 13 are used together to control the rotor 12 of the motor 1 to alter its phase regarding the polarities N and S in operation. And, the motor controlling unit 26 outputs a high/low alternation frequency generation (FG) signal, or a rotational detection alarm (RD) signal when no a variation of the high/low level within a predetermined time period. Further, the power modulation controlling unit 28 is used to modulate the constant current unit 24 and the prior driving unit 22, and the prior driving unit 22 is used to modulate an output power of the motor to drive the low voltage DC brushless motor 1 or the power modulation controlling unit 28 to modulate the motor controlling unit 26 to have a modulated output power of the motor. When the motor goes beyond the required power or voltage, or the motor is deadly locked, the protective compensation unit 25 closes or compensates the constant current unit 24, where the protective compensation unit 25 may compensate the motor's voltage, current, frequency, or power. The constant current unit 24 may present in an average constant current mode or as the active PFC constant current circuit, and in this form sample on the AC power waveform, so as to push the power factor nearly to 1 and thus the overall load to be further near a resistivity to achieve in an efficacy of energy saving.

Referring to FIG. 4, a schematic diagram of the basic architecture according to a second embodiment of the present invention. As shown, the present invention may have its alternative form, the second embodiment, compared with the first embodiment described in the above. The difference of the second embodiment with respect to the first embodiment. The brushless fan motor 3 comprises a case 31, a static 32 combined within an inner rim of the case 31, a rotor 33 disposed within and corresponding to the stator 32, bearings 34 each disposed at two ends of the case 31, and a shaft 35 penetrating through the rotor 33 and the bearing 34. The active power adjustment mechanism 2 is disposed within the case 31, and the motor driving unit 23 is connected to the stator 13. As such, the present invention may also be applicable to an inner-rotor motor and the identical efficacy similar to the first embodiment may also be achieved, lending to a realization of different motors use state for the present invention.

Referring to FIG. 5, a schematic diagram of the basic architecture according to a third embodiment of the present invention. As shown, besides the brushless fan motor 1 and the brushless fan motor 3 in the first and second embodiments, the brushless fan motor may further be in the form of the third embodiment having the difference stated as what follows.

The active power adjustment mechanism 2a is disposed at an outer side of the brushless motor 1, or the brushless motor 3, and comprises a power modulation controlling unit 28a, an EMI filtering and rectifying unit 21a, a prior driving unit 22a, a constant current unit 24a, a protective compensation unit 26a, and a sensing unit 27a, all being disposed a printed circuit board (PCB) and within the brushless fan motor. As such, the efficacy identical to those for the first and second embodiments may be achieved, and thus different motor's use state may be satisfied by the present invention.

In summary, the AC and DC brushless motor for the fan may overcome the shortcomings encountered In the prior art, by using the active power adjustment mechanism together to enable the low voltage DC brushless motor for the fan to be driven by directly using the AC power or the DC power to improve the power consumption of the conventional AC motor for the fan or achieve the efficacy of energy saving.

From all these views, the present invention may be deemed as being more effective, practical, useful for the consumer's demand, and thus may meet with the requirements for a patent.

The above described is merely examples and preferred embodiments of the present invention, and not exemplified to intend to limit the present invention. Any modifications and changes without departing from the scope of the spirit of the present invention are deemed as within the scope of the present invention. The scope of the present invention is to be interpreted with the scope as defined in the claims.

What is claimed is:

1. An alternating current (AC) and direct current (DC) brushless motor, comprising:
    a brushless motor and
    an active power adjustment mechanism comprising:
        an EMI filtering and rectifying unit connected with a lead wire supplying AC power or DC power,
        a prior driving unit connected to the EMI filtering and rectifying unit,
        a motor driving unit connected to the brushless motor and the prior driving unit,
        a constant current unit connected to the EMI filtering and rectifying unit and to the prior driving unit and wherein the constant current unit and the prior driving unit operate in coordination with a semiconductor switch element, a current limitation resistor, and an inductive element to acquire a required power from either an AC supply or from a direct mode constant current from a DC supply,
        a protective compensation unit connected to the prior driving unit and to the constant current unit and compensating voltage, current, frequency, or power of the brushless motor,
        a motor controlling unit connected to the prior driving unit and generating a frequency generation (FG) alarm output signal,
        a sensing unit connected to the motor controlling unit and the brushless motor so as to detect a phase and polarity of the brushless motor, and
        a power modulation controlling unit connected to the constant current unit and which has a pulse width modulation (PWM) input controlling signal and wherein the power modulation controlling unit modulates the constant current unit and the prior driving unit and wherein the prior driving unit modulates an output power of the brushless motor.

2. The AC and DC brushless motor as claimed in claim 1, wherein the brushless motor comprises a case, a rotor arranged on an inner surface of the case, a stator disposed within and corresponding to the rotor and connected to the motor driving unit, a bearing disposed within the stator, and a shaft penetrating through the bearing.

3. The AC and DC brushless motor of claim 1, wherein the brushless motor comprises a case, a stator arranged on an inner surface of the case, a rotor disposed within and corresponding to the stator and connected to the motor driving unit, a bearing disposed within the rotor, and a shaft penetrating through the bearing.

4. The AC and DC brushless motor of claim 1, wherein the active power adjustment mechanism is arranged within the brushless motor.

5. The AC and DC brushless motor of claim 1, wherein the active power adjustment mechanism is arranged external to the brushless motor.

6. The AC and DC brushless motor of claim 1, wherein input power is AC at 50/60 Hz and wherein the constant current unit further comprises a power factor correction (PFC) function such that the AC and DC brushless motor presents a resistive load.

* * * * *